United States Patent
Andrianov et al.

[11] 3,944,520
[45] Mar. 16, 1976

[54] CYCLOLINEAR POLYORGANOSILOXANES AND METHOD FOR PREPARING SAME

[76] Inventors: Kuzma Andrianovich Andrianov, Vystavochny pereulok, 3, kv. 9; Natalia Nikolaevna Makarova, ulitsa Bolshaya Cherkizovskaya, 8 korpus 1, kv. 24, both of Moscow, U.S.S.R.

[22] Filed: Apr. 18, 1974

[21] Appl. No.: 461,980

[52] U.S. Cl. .................... 260/46.5 R; 260/448.2 E
[51] Int. Cl.² .......................................... C08G 77/04
[58] Field of Search .................. 260/465 R, 448.2 E

[56] References Cited
UNITED STATES PATENTS

| | | | |
|---|---|---|---|
| 3,017,386 | 1/1962 | Brown, Jr. et al. | 260/46.5 R |
| 3,162,614 | 12/1964 | Katchman | 260/46.5 R |

*Primary Examiner*—Lewis T. Jacobs
*Attorney, Agent, or Firm*—Steinberg & Blake

[57] ABSTRACT

Cyclolinear polyorganosiloxanes are proposed having the formula $$[XC_6H_4SiO_{1.5}]_n$$

where X is F, Cl or Br and $n$ is from $2 \times 10$ to $2 \times 10^4$ and the method for preparing them, that consists in hydrolytic polycondensation of the starting phenyltrichlorosilane halide in an organic solvent immiscible with water at temperatures from 5° to 40°C; water is then separated and the solution of the reaction products in the organic solvent is washed with water to neutral reaction and polymerized in the presence of a nucleophilic catalyst utilized in an amount of from 0.002 to 0.25 per cent by weight, at temperatures from 80° to 250°C, with subsequent isolation of the end product. X may be in ortho, metal or para position, or mixed isomers may be used.

1 Claim, No Drawings

CYCLOLINEAR POLYORGANOSILOXANES AND METHOD FOR PREPARING SAME

This invention relates to polyorganosiloxanes, and more particularly to cyclolinear polyorganosiloxanes and the method for preparing them.

Polymers belonging to the said class of chemical compounds are known in the prior art, and the methods for isolating them have been covered in some patents.

Said polyorganosiloxanes are widely used in industry as protective films, and for the manufacture of various articles by pressure-moulding. Moreover, various compositions can be made on the basis of the said polyorganosiloxanes that can be used as coatings protecting articles from the action of the atmospheric aggressive agents, and possessing water repelling properties, thermal stability, etc.

Cyclolinear polyorganosiloxanes are known to be obtained from products prepared by hydrolytic polycondensation (J. Am. Chem. Soc., 82, 6194 (1960) (diagram 1), and also from cell-like octaphenylsilsesquioxane, the term 'silsesquioxane' expressing the ratio 1.5 of oxygen atom to silicon atom (diagram 2) (U.S. Pat. No. 3,162,614, (1962) Andrianov, K. A. et al. High-molecular compounds', 8, 1477 (1965) Papers of the Academy of Sciences of the USSR, 166, 4, 855 (1966).

Moreover, the method for preparing cyclolinear polysiloxanes having the polymerization coefficient $n \geq 25$, which, owing to the low molecular weight, can undergo various chemical modifications is known in the art. To that end, the high-molecular polymer is reconstructed in the presence of water, piperidine or 1,4-diazobicyclo(2,2,2)-octane as a catalyst in a medium of tetrahydrofuran, into a low-molecular polymer-oligomer (U.S. Pat. No. 3,294,738, 1966).

Cyclolinear polyorganosiloxanes are known with various substituents at the silicon atom, such as phenyl, tolyl, 3-methyl-butene-1 radicals, and also polymers with phenyl radicals, as well as various aliphatic radicals, from methyl to hexyl (U.S. Pat. No. 3,234,170, Andrianov, K. A., Makarova, N. N., Inventor's Certificate of the USSR No. 231,813), and alkenyl radicals.

Introduction into cyclolinear polyorganosiloxanes of various organic substituents, that are linked to the silicon atom, makes it possible to prepare polyorganosiloxanes possessing various valuable properties, such as high thermal stability, tensile strength, deformation, elongation, etc. For example, introduction into cyclolinear polyorganosiloxanes of a phenyl substituent at the silicon atom increases the thermal stability.

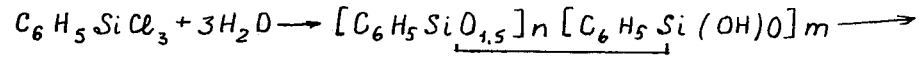

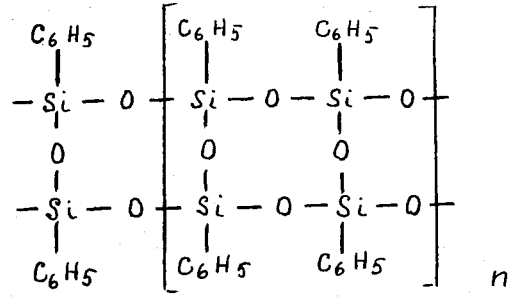

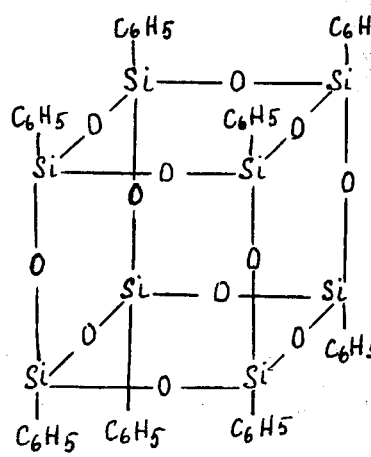

diagram 1.

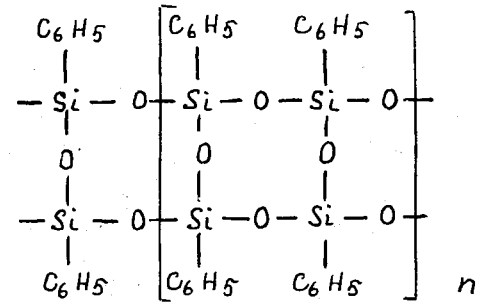

diagram 2.

Besides the properties that are valuable with respect to the industrial use of cyclolinear polyorganosiloxanes, they also possess an essential disadvantage, namely very low adhesion to solid construction material such as glass, metals, plastics, etc.

The object of this invention is to prepare polyorganosiloxanes that would preserve the valuable properties inherent in cyclolinear polyorganosiloxanes, such as high tensile strength, deformation, elongation, etc., and would also possess higher adhesion to glass, metals, plastics, and other construction materials, and also to work out a method for preparing such cyclolinear polyorganosiloxanes.

This object has been attained by synthesizing cyclolinear polyorganosiloxanes characterized by the general formula $$[X\ C_6H_4SiO_{1.5}]_n$$

where X is F, Cl or Br, and $n$ is from $2 \times 10$ to $2 \times 0\ 10^4$.

The object has been attained by a method for preparing cyclolinear polyorganosiloxanes having the general formula $$[XC_6H_4SiO_{1.5}]_n$$

where X is F, Cl or Br and $n$ is from $2 \times 10$ to $2 \times 10^4$,

The object has been attained by a method for preparing cyclolinear polyorganosiloxanes having the general formula $$[XC_6H_4SiO_{1.5}]_n$$

where X is F, Cl or Br and $n$ is from $2 \times 10$ to $2 \times 10^4$, consisting in that the starting phenyltrichlorosilane halide undergoes hydrolytic polycondensation in an organic solvent stable in an acid medium and immiscible with water, at temperatures from 5° to 40°C, then water is separated, and the solution of the reaction products in the organic solvent is washed with water to neutral pH of 6 – 7, and the product is polymerized in the presence of a nucleophilic catalyst utilzed in a quantity of 0.002 to 0.25 per cent by weight at temperatures from 80 to 250°C, with subsequent isolation of the end product.

The introduction of a substituent, a halide, into the phenyl radical which is an organic substituent at the silicon atom of the cyclolinear polysiloxane, imparts to the proposed polymer high adhesion and preserves the high thermal and thermo-oxidative stability and the high physico-mechanical properties of the polymer (tensile strength, elongation, elastic deformation).

The cyclolinear structure of the synthesized polymers has been proved by elementary analysis, I-R spectra, X-ray studies, hydrodynamic and dynamooptical properties of polymer solutions.

The I-R absorption spectra of the polymer specimens show splitting of the absorption band characteristic of anti-symmetric valence oscillations of the siloxane bond in the region of 1000 – 1200 cm$^{-1}$, with two maxima at 1045 cm$^{-1}$ and 1130–1140 cm$^{-1}$. Two or three halos have been found in X-ray patterns. Chlorophenylsilsesquioxane polymer is characterized by the following interplane distance:

$$d_1 = 13.5\ \text{A.},$$

$$d_2 = 4.3\ \text{A.,  and}$$

$$d_3 = 8.0\ \text{A.};$$

the first of which characterized the inter-chain distance between macro-molecules.

The value of the Kuhn segment length A, found to be 180 A., and also the number of the monomer units in the Kuhn segment S, found to be 70, show that these values are ten times and over higher than the corresponding values found for the linear non-cyclic siloxane chain. This proves that the polymer molecule has a two-chain structure.

The hydrodynamic studies made it possible to find the values of "K" and $a$ in the Mark-Kuhn-Houwink equation:

$$[\eta] = K \times M^a$$

where
[$\eta$] is the intrinsic viscosity determined experimentally;
K and $a$ are equation constants; and
M is the molecular weight of the polymer as determined by the sedimentation or ebulioscopic methods.

The above equation characterizes the intrinsic viscosity of the polymer as a variable dependent on its molecular weight and makes it possible to determine the molecular weight of the polymer provided K and a are known. The following values of K and a for cyclolinear polyhalide diphenylsiloxanes have been found experimentally:

$$K = 2.3 \times 10^{-5};\ a = 1.2\ \text{fo}\ M = 6 \times 10^4\ \text{to}\ 3 \times 10^5$$
$$K = 3.5 \times 3.0 \times 10^{-2}a = 0.7\ \text{for}\ M = 5 \times 10^5\ \text{to}\ 1.5 \times 10^5$$

There exists a dependence between the values of M and $n$ in the general formula $$[XC_6H_4SiO_{1.5}]_n$$

characterizing the proposed cyclolinear polyorganosiloxanes; this relationship interconnects the intrinsic viscosity of the polymer [$\eta$] (determined experimentally with the value $n$ which characterizes the degree of polymerization of polyorganosiloxane.

This inter-relationship is expressed by the ratio of the molecular weight of the polymer to the molecular weight of the elementary cell $$[XC_6H_4SiO_{1.5}]_n$$

which is $128 + Ax$, where $Ax$ is the atomic weight of the corresponding halide:

$$n = \frac{M}{128 + Ax}$$

The proposed cyclolinear polyorganosiloxanes are fully soluble in such solvents as benzene, toluene, chloroform and cyclohexane. The melting point of both low and high-molecular cyclolinear polyorganosiloxanes is above their decomposition point. (The melting point was determined both in air and in an inert atmosphere). This also proves the cyclic form of the macromolecules of polyorganosiloxane which is only realized in a cyclolinear structure of the polymer.

The proposed polyorganosiloxanes according to the invention can form films. Mechanical tests of 45–50 microns thick films, prepared by the methods of single and two-fold pouring, have shown that the tensile strength increases with growing molecular weight of the polymer according to this formula $$\sigma = f(M)$$

where
 $\sigma$ is the tensile strength in kg/sq.cm;
 $f$ is the function; and
 $M$ is the molecular weight of the polyorganosiloxane.

The tensile strength may be as high as 300 kg/sq.cm. The tensile strength decreases with increasing temperatures.

The elongation at break increases with temperature and approaches 100 per cent, while this value does not exceed 15–20 per cent in the known polyphenylsilosesquioxanes.

Films of the obtained polymer preserve their good adhesive properties within a wide range of temperatures (from 70° to 400°C).

Films can be applied to various materials; they have increased adhesion to iron, copper and other metals, to glass, quartz, polyethylene, polytetrafluoroethylene, etc.

The proposed polymers according to the invention are stable at temperature to 480°C, and loss in weight is not more than 1–2 per cent at a temperature of 550°C.

The advantage of the proposed polyorganosiloxanes is also their ability to form coatings on substrates without any special preparation of the surface.

The proposed cyclolinear polyorganosiloxanes are prepared by the method in which, according to the invention, the starting phenyltrichlorisilane halide is subject to hydrolytic polycondensation.

The reaction is carried out in an organic solvent stable in acid medium and immiscible with water, at temperatures from 5° to 40°C; water is then separated and the solution of the reaction products in the organic solvent is washed with water to pH 6 – 7 and polymerized in the presence of a nucleophilic catalyst in an amount of 0.002 – 0.25 per cent by weight at temperatures from 80° to 250°C, with subsequent isolation of the end product.

Hydrolytic polycondensation of the starting phenyltrichlorosilane halide is carried out in an organic solvent in the absence of a catalyst. The hydrolysing agent is water taken in excess with respect to phenyltrichlorosilane halide. Hydrochloric acid produced in the hydrolysis is dissolved in water and produces acid medium thus performing the role of a catalyst in the reaction of polycondensation. The conditions for realization of the hydrolysis and polycondensation are as follows: the organic solvent should be stable in acid medium, insoluble, or at least sparingly soluble in water, and ensuring a distinct interface with water. The hydrolysis and polycondensation of phenyltrichlorosilane halide should be carried out at temperatures from 5 to 40°C, since the hydrolysis is an exothermic reaction. Insignificant initial cooling, not requiring much cold consumption, ensures further uniform and quiet hydrolysis reaction at a sufficient rate and to a sufficient degree. Heat liberated in the reaction is sufficient to ensure the optimum rate of the reaction so that no external source of heat is required. The polyorganosiloxane prepared by the hydrolysis and polycondensation reactions has a low degree of polymerization; it contains functional hydroxyl groups connected to the silicon atom and can be referred to as a pre-polymer, a compound having the characteristics of a polymer but having a relatively low molecular weight. The composition and the structure of the pre-polymer is characterized by the following structural formula:

$$[XC_6H_4SiO_{1.5}]_y - [XC_6H_4Si(OH)O]_z n$$

where
 X is Cl, F, or Br;
 y is 0,2 or 4; and
 z is from 4 to 6.

Further polymerization of the obtained pre-polymer is carried out in the presence of a catalyst. To that end, the aqueous phase is separated from the pre-polymer solution in an organic solvent, the solution is washed with water to neutral reaction, and then the catalyst is added. The polymer can be prepared at both low and high temperatures. Thus, according to the invention, cyclolinear polyorganosiloxanes having the general formula $$[XC_6H_4SiO_{1.5}]_n$$

where $n = 2 \times 10 - 1 \times 0\ 10^2$ are prepared by catalytic polymerization at temperatures from 80° to 110°C.

The prepared "low-molecular" cyclolinear polyorganosiloxanes can be compared to oligomers, i.e. the polymers having lower molecular weights. In contrast to pre-polymers oligomers do not contain hydroxyl functional groups joined to the silicon atom and are characterized by the above formula where $n$ is from $2 \times 10$ to $1 \times 10^2$.

Oligomers can be used as an impregnating material in the manufacture of plastics containing glass fibre as a filler, or they can be further polymerized to prepare polymers having higher degree of polymerization.

Thus, according to the invention, cyclolinear polyorganosiloxanes having the general formula $$[XC_6H_4SiO_{1.5}]_n$$

where $n$ is $1 \times 10^2 - 2 \times 10^4$ are prepared by catalytic polymerization at temperatures from 80° to 110°C, then the solution is evaporated under vacuum to a concentration of polyorganosiloxane of 50 – 70 per cent by weight; then diphenyl, diphenyl oxide, or a mixture thereof or ditolylmethane, in a quantity of 1 to 10 per cent of polyorganosiloxane weight, is added to the obtained solution and catalytic polymerization is carried out at temperatures from 220° to 250°C.

In accordance with this embodiment of the invention, the reaction of pre-polymer polymerization is realized in two steps, namely, condensation polymerization (in which water is produced) in dilute (not less than 50 per cent by weight) solutions at low temperatures (80° – 110°C) as a result of which the oligomer is produced, and the second step in which polymerization proper is effected at high temperatures (220°– 250°C) in concentrated solutions (50 – 70 per cent by weight) in the presence of high-boiling compounds such as diphenyl, diphenyl oxide, a mixture thereof, or ditolylmethane, that perform the role of high-boiling solvents and of plasticizers of the prepared polymer and producing a regulating effect on the molecular weight of the polymer.

In addition to the above two-step process for preparing cyclolinear polyorganosiloxanes with intermediate formation of oligomer, the catalytic polymerization can be effected in a single stage, in which the processes of polycondensation and polymerization are combined, the process being carried out at high temperatures, from 220° to 250°C.

To that end, according to the invention, a catalyst and diphenyl, diphenyl oxide, a mixture thereof, or dimethylmethane are added to the solution before catalytic polymerization in a quantity from 1 to 10 per cent (with respect to the weight of polyorganosiloxane) and the polymerization is carried out at a temperature from 220° to 250°C.

The single-step process of polymerization is especially profitable in industrial conditions when the product is prepared on a large industrial scale, and the production capacity of chemical apparatus and also the requirements for raw materials are of prime importance.

If polyorganosiloxanes having special properties are required, the two-step process with intermediate preparation of oligomers would be preferred, since it provides conditions for a wider variation of the factors that are important for the molecular weight of polyorganosiloxanes and hence for the properties of the polymer.

For example, in the process with intermediate production of oligomer, it is possible to utilize the nucleophilic catalyst in lower concentrations (according to the invention, from 0.002 to 0.15 per cent by weight).

Moreover, by changing the concentration of the high-boiling additive (diphenyl, diphenyl oxide, etc) within the range from 1 to 10 per cent by weight, and also by varying the time of polymerization at high temperature, it is possible to vary the molecular weight of the cyclolinear polyorganosiloxane within wide limits.

For example, intrinsic viscosity [$\eta$] for the polymer prepared with the nucleophilic catalyst utilized in a concentration of 0.2 per cent by weight is 2.5 dl/g, while in the concentration of the catalyst of 0.15 per cent by weight the viscosity of the same polymer is 4.0 dl/g.

Increasing concentration of ditolylmethane from 2.7 per cent to 7.5 per cent by weight decreases intrinsic viscosity from 2.5 dl/g to 1.2 dl/g, the other conditions remaining unaltered.

If polymerization is continued for seven minutes, the intrinsic viscosity of the specimen is [$\eta$]= 0.2 dl/g, and with the time of polymerization increasing to sixty minutes the viscosity increases to 3.8 dl/g.

Various phenyltrichlorosilanes halides (fluoride, chloride, bromide) are recommended to be used for preparing cyclolinear polyorganosiloxanes according to the invention. All these monomers are suitable for use in the proposed method, since they ensure high adhesion in the prepared cyclolinear polyorganosiloxanes.

It is recommended also, according to the invention, to utilize diethyl ether, benzene or toluene as organic solvents. These solvents are immiscible with water and produce a distinct interface with water. They are stable in acid medium and are good solvents for the prepared polymers; they do not contaminate the end product with products of side reactions and make it possible to carry out the reaction at required temperatures.

It is recommended according to the invention, to use hydroxides of K, Na and Cs as well as organosilicon bases having the formula

$KO[Si(CH_3)O]_n \cdot Si(CH_3)_2 OH$, where $n$ is from 3 to 8, or $(CH_3)_4 NOH$, as nucleophilic catalysts.

The above organosilicon compounds used as nucleophilic catalysts make it possible to decrease significantly the quantity of the catalyst required for the process, namely to 0.002 per cent by weight.

To prevent undesirable destruction and oxidation (that are possible with polymerization at high temperatures of 220°– 250°C) it is recommended according to the invention, to carry out the polymerization process in an atmosphere of an inert or a noble gas, e.g. nitrogen or argon.

It has already been noted that cyclolinear polyorganosiloxanes prepared by the proposed method have high adhesion properties combined with high thermal stability and mechanical strength.

The comparative characteristics of the proposed polymers and of similar (with respect to the composition and structure) known polyorganosiloxanes (polyorganosilsesquioxanes) are given in the Table that follows hereinbelow.

Table

| Cyclolinear polyorgano-siloxane | Tensile strength at 20°C in kg/cm² | Elongation at break at 180°C in % | Initial temperature of weight loss, in °C | Adhesion, kg/sq.cm |
| --- | --- | --- | --- | --- |
| Polyphenylsilses-quioxane | 500–600 | 25 | 380–480 | to 5 |
| Polyalkylsilses-quioxane | 100 | 15 | 350–390 | to 5 |
| Polyalkylsilses-quioxane | 250–500 | 45–100 | 360–480 | to 10 |
| Polychlorophenyl-silsesquioxane | 200–300 | 60–100 | 480–520 | 50–70 (two-layer coat) |

The proposed cyclolinear polyorganosiloxanes can be used in all branches of industry where polymers having high thermal and radiation resistance and also high adhesion are required.

The method for preparing the proposed cyclolinear polyorganosiloxanes can be carried out utilizing common chemical equipment. The method is simple in realization and does not require much energy, or rare chemicals.

Other advantages of the invention will become subsequently clear from examples of its practical embodiment which are given below by way of illustration.

EXAMPLE 1 m-Chlorophenyltrichlorosilane (I) was hydrolysed in a flask provided with a stirrer, a reflux condenser, a thermometer and a dropping funnel. First 20 ml of water and 10 ml of diethyl ether were placed into the flask and then a solution of 8.86 g (0.036 mole) of compound I (b.p. 227°– 230°C, Cl. 57.53; 57.18) in 10 ml of diethyl ether were added through the dropping funnel at a temperature of 25°– 27°C. The ether layer was separated, washed with water to neutral reaction, dried over $Na_2SO_4$, passed through a filter and remaining traces of the ether removed by vacuum distillation at 1 – 3 mm Hg to constant weight. The yield of a viscous compound (II) was 5.72 g.

Then 0.55 g of compound II, 0.027 g (5 per cent by weight) of ditolylmethane (DTM), 0.59 g of benzene and 0.085 ml of a 0.20N solution of KOH in ethyl alcohol (0.2 per cent by weight) were placed into the flasks and the polymerization was carried out on a bath at a temperature of 245°– 250°C for thirty minutes in a current of a noble gas (argon).

The polymerization product was cooled and dissolved in benzene. The solution was then heated with a two-fold excess of methyl alcohol to obtain 0.45 g (82 per cent) of asbestos-like compound III having the intrinsic viscosity $[\eta]= 4.0$ dl/g, which corresponds to the value of $n = 2 \times 10^4$; the melting point was above 450°C.

Found, in per cent: C 44.60; H 2.55; Si 17.40; 17.43; Cl 20.92; 20.74.

Calculated for $[ClC_6H_4SiO_{1.5}]_n$ : C 44.04; H 2.46; Si 17.47; Cl. 21.67.

EXAMPLE 2

Compound I was hydrolysed as described in Example 1.

60 ml of benzene and 50 ml of water were placed in a flask, and at a temperature of 40°– 50°C a solution of 42.8 g of compound I in 60 ml of benzene was added. The reaction product in benzene solution was then washed with water to pH 6 – 7, dried over $Na_2SO_4$, passed through a filter, and finally compound IV in benzene solution was obtained.

Catalyst polymerization was carried out in a flask provided with a Dean-and-Stark receiver and a reflux condenser. 40 ml of the benzene solution of compound IV and 0.052 g (0.01 per cent by weight ) of benzene solution of

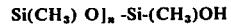

were introduced into a flask. The mixture was kept at a temperature of 80°C (boiling point of the solvent) for 10 hours. 0.4 g of water was collected, and the solvent was distilled to give 9.0 g of compond V in the form of a vitreous powder having $\eta$ sp/C 1% solution equal to 0.035, M = 3,500 (n = 2×10).

Found for compound V, in per cent: C 44.01; 43.85; H 2.74; 2.55, Si 17.45; 17.50; Cl 21.45; 21.62

Calculated for $[ClC_6H_4SiO_{1.5}]_n$ : C 44.04; H 2.46; Si 17.17 Cl 21.67.

EXAMPLE 3

The hydrolysis reaction and catalytic polymerization was carried out by a procedure similar to that described in Example 2. 40 ml of compound IV and $(CH_3)_4NOH$ (0.005 per cent) were introduced into a flask. After boiling for six hours, 0.37 ml of water was isolated. The solvent was distilled off to liberate 8.7 g of compound VI having $\eta$ sp/C $_{1\% \ sol}$ = 0.04; M = 3,900; n = 2×10.

Found for compound VI, in per cent: C 44.27; 44.03; H 2.53; 2.48; Si 17.15; 16.90; Cl 21.40; 21.65.

Calculated for $[ClC_6H_4SiO_{1.5}]_n$: C 44.04; H 2.46; Si 17.17; Cl 21.67.

EXAMPLE 4

The hydrolysis reaction and catalytic polymerization was carried out as in Example 2. 40 ml of a solution of compound IV and 0.002 per cent by weight of

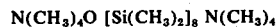

were introduced into a flask.

The mixture was heated to a temperature of boiling benzene for four hours, the formed water was separated, the solution passed through a filter, and the solvent removed by distillation to obtain 8.2 g of vitreous compound VII having $\eta$ sp/$C_{1\% \ sol}$=0.04, mol. wt. 5,400, $n$ about $2 \times 10$.

Found for compound VII, in per cent: C 43.82; 43.64; H 2.34; 2.30; Si 17.29; 17.28; Cl 21.39; 20.98.

Calculated for $[ClC_6H_4SiO_{1.5}]_n$: C44.04; H 2.46; Si 17.17 Cl. 21.67.

EXAMPLE 5

Hydrolysis of a mixture of isomers having the following composition: m-chlorophenyltrichlorosilane (I) 90 per cent, o-chlorophenyltrichlorosilane (VIII) 10 per cent, was carried out by a procedure similar to that described in Example 1. 11.08 g of compound I, 1.28 g of compound VIII, 26 ml of diethyl ether and 26 ml of water were introduced into a flask. 7.60 g of compound IX were obtained. The polymerization was carried out by a procedure similar to that described in Example 1 in a current of nitrogen. The polymerization charge was 0.52 g of compound IX, 0.03 g (5.7 per cent by weight) of DTM, 0.55 ml of benzene and 0.30 ml of a 0.08N solution of KOH in alcohol (0.25 per cent by weight). In 50 minutes 0.47 g of product IX was obtained which was recovered from the solvent by distillation. The product had $[\eta] = 2.0$ dl/g, which corresponds to $n$ 1 to $n = 1 \times 10^4$.

EXAMPLE 6

Hydrolysis of m-bromophenyltrichlorosilane (X) (b.p. 85.0°– 85.5°C at p = 1 – 2 mm Hg, Hal found 64.31; 64.20; Hal calculated 64.10) was carried out by a procedure similar to that described in Example 1 at a temperature of 5°– 7°C. 8.15 g of compound X, 22 ml of diethyl ether, 16 ml of water were subjected to hydrolysis. The compound yield was 5.6 g of product XI.

Found, in per cent: C 34.82; 34.99; H 1.80; 1.74; Si 12.68; 13.16; Br 38.28; 38.43; OH 3.54; 3.78;

Calculated for $(BrC_6H_4)_2Si_2(OH)O_3$: C 34.00; H 2.11; Si 13.15; Br 37.70; OH 4.01

0.56 g of compound XI, 0.03 g (per cent) of DTM, 0.50 g of toluene, 0.08N alcoholic solution of KOH (0.15 per cent by weight) were subjected to polymerization. In 15 minutes, in conditions similar to those described in Example 1, utilizing a current of argon 0.35 g of polymer XII was prepared which, upon precipitation from the benzene-alcoholic solution, yielded a powder. The characteristics of the polymer are as follows:

$[\eta] = 0.2$ dl/g, $[n] = 2 \times 10^2$.

EXAMPLE 7

Compound XI was subjected to catalytic polymerization under conditions similar to those described in Example 2, at a temperature of 110°C. 5.1 g of compound XI, 20 ml of toluene, 0.5 ml of a 0.08 N solution of KOH in alcohol (0.05 per cent by weight) were utilized. After removal of the solvent by distillation, 4.9 g of compound XII were obtained.

Found, in per cent: C 35.48; 35.41; H 1.72; 2.00; Si 13.42; 13.26; Br 38.90; 38.99.

Calculated for $[BrCH_4SiO_{1.5}]_n$ : C 34.63; H 1.92 Si 13.50; Br 38.41.

Compound XII was polymerized under conditions similar to those described in Example 1. 0.55 g of compound XII, 0.05 g (10 per cent by weight) of diphenyl, 0.7 g of toluene, 0.18 ml of a 0.08 N solution of KOH in alcohol (0.15 per cent by weight) were subjected to polymerization. In 30 minutes, at a temperature of 220°C, the completely soluble compound XIII having $[\eta] = 0.2$ dl/g, $n = 2 \times 10^2$ was prepared and was precipitated from benzene-alcoholic solution as a white powder.

Found, in per cent: C 36.12; 35.91; H 1.48; 1.58 Si 13.55; 13.40; Br. 39.90.

Calculated for $[BrC_6H_4SiO_{1.5}]_n$: C 34.63; H 1.92; Si 13.50; Br 38.41.

EXAMPLE 8

A mixture of compounds I and X was hydrolyzed by the procedure described in Example 2.

22.0 g (0.09 mole) of compound I, 2.9 g (0.01 mole) of compound X, 50 ml of benzene and 50 ml of water were utilized. After distillation of the solvent, compound XIV was obtained.

Found: OH 5.05; 4.90.

1.08 g of compound XIV, 0.01 g (1 per cent) of DTM, 0.15 ml of KOH solution (0.14N) (0.12 per cent by weight), 0.87 g of benzene were subjected to polymerization. In 20 minutes, at a temperature of 220°–225°C, polymer XV having $[\eta] = 0.75$ dl/g was prepared.

EXAMPLE 9

Compound I was hydrolyzed in benzene at a temperature of 45°C under conditions similar to those described in Example 2. 43.0 g of compound I, 120 ml of benzene and 60 ml of water were introduced into a flask. Then, 40 ml of compound XVI resulting from the hydrolysis were condensed in the presence of 0.015 per cent of KO Si(CH$_3$)$_2$O SiOH; for two hours at a temperature of 80°C. 40 ml of benzene solution were evaporated under vacuum at 10 – 15 mm Hg to a concentration of the solution of 50 per cent. To 18 g of the solution in the reaction flask was added 0.1 per cent by weight of $KO[Si(CH_3)O]_n$ -Si-$(CH_3)_2OH$ solution in benzene 0.2 g (2.2 per cent by weight) of diphenyloxide and the polymerization was carried out at a temperature of 245°C in a current of argon. In thirty minutes 6.5 g of the polymer XVII was prepared, which was precipitated from the benzene-alcohol mixture and had $[\eta] = 1.2$ dl/g.

EXAMPLE 10.

Compound I was hydrolyzed under conditions similar to those described in Example 2.40 ml of the hydrolysis compound XVI were condensed in the presence of 0.012 g (0.15 per cent by weight) of NaOH. After six hours of boiling at 80°C, 0.35 ml of water was isolated, and then the solvent was distilled from the solution to the concentration of the solution of 70 per cent. To 13.0 g of the reaction mixture were added 0.72 g (8.0 per cent by weight) of a mixture of diphenyl and diphenyl oxide (72 and 28 per cent respectively), 1.0 ml of a 0.215 N solution of NaOH in alcohol. In thirty minutes 6.4 g of compound XVIII were prepared having $[\eta] = 0.3$ dl/g, and $n = 4 \times 10^2$.

EXAMPLE 11

Compound I was hydrolized under conditions similar to those described in Example 2.40 ml of the hydrolysis product XVI were subjected to catalytic polymerization in the presence of 0.02 per cent by weight of CsOH for two hours at a temperature of 80°C. The reaction product in benzene solution was then evaporated to the concentration of 70 per cent under vacuum at 10 – 15 mm Hg. To 17.9 g of the solution were added 0.03 per cent by weight of CsOH and 0.15 g (1.6 per cent by weight) of diphenyl oxide.

The polymerization was carried out in a current of argon at a temperature of 245°– 250°C. Alcohol was then added to the benzene solution to precipitate 7.0 g of the polymerized compound XIX having $[\eta] = 1.6$ dl/g.

EXAMPLE 12 m-Fluorophenyltrichlorosilane (XX) (b.p. 205°–207°C) was hydrolyzed by the procedure described in Example 1 5 g of compound XX, 25 ml of cyclohexane and 25 ml of water were utilized. The yield of compound XXI was 3.5 g.

Compound XXI was polymerized under conditions similar to those described in Example 1 at a temperature of 250°C. 1.0 g of compound XXI, 0.06 g of DTM, 0.8 g of benzene and 0.18 ml of a 0.08 N alcoholic solution of KOH were utilized. The yield of compound XXII was 0.8 g $[\eta] = 1.9$ dl/g

We claim:

1. A cyclolinear polyorganosiloxane of the formula:
$[XC_6H_4SiO_{1.5}]_n$
wherein X is selected from the group consisting of F, Cl and Br, and wherein $n$ is $2 \times 10 - 2 \times 10^4$.

* * * * *